United States Patent [19]

Doll

[11] Patent Number: 5,453,906
[45] Date of Patent: Sep. 26, 1995

[54] METALLIZED FILM SERIES SECTION CAPACITOR WITH IMPROVED OXIDATION RESISTANCE

[75] Inventor: Kevin J. Doll, Des Plaines, Ill.

[73] Assignee: Philips Electronics North America Corporation, New York, N.Y.

[21] Appl. No.: 410,547

[22] Filed: Mar. 23, 1995

Related U.S. Application Data

[63] Continuation of Ser. No. 329,793, Oct. 26, 1994, abandoned, which is a continuation of Ser. No. 141,165, Oct. 21, 1993, abandoned.

[51] Int. Cl.⁶ ........................................... H01G 2/12
[52] U.S. Cl. .................. 361/273; 361/275.1; 361/303; 361/304; 361/305; 361/323; 361/330
[58] Field of Search ........................ 361/272, 273, 361/275.1, 301.5, 303, 304, 305, 306.1, 308.1, 309, 311, 323, 328, 329, 330, 511, 512, 513, 514, 515

[56] References Cited

U.S. PATENT DOCUMENTS

| | | | |
|---|---|---|---|
| 2,637,766 | 5/1953 | Grouse | 361/304 |
| 3,675,094 | 7/1972 | Voelkl | 29/25.42 |
| 4,142,222 | 2/1979 | Kotschy et al. | 361/273 |
| 4,215,385 | 7/1980 | Behn et al. | 361/273 |

FOREIGN PATENT DOCUMENTS

| | | | |
|---|---|---|---|
| 0072458 | 2/1983 | European Pat. Off. | 361/328 |
| 0200089 | 12/1986 | European Pat. Off. | |
| 0394475 | 10/1990 | European Pat. Off. | |
| 2826481 | 1/1980 | Germany | 361/304 |
| 3245514 | 11/1991 | Japan | |
| 5094924 | 4/1993 | Japan | 361/273 |
| 1450594 | 9/1976 | United Kingdom | |

Primary Examiner—Teresa J. Walberg
Assistant Examiner—Gregory L. Mills
Attorney, Agent, or Firm—Edward Blocker

[57] ABSTRACT

A series section metallized film capacitor in which the metal layers are varied in thickness such that high oxidation areas are thicker than low oxidation areas. In particular, the edge portions bordering a center margin electrode gap have a thickness which is greater than the remaining area of the center margin electrode. The increased thickness at the edge portions reduces the oxidation effect and the associated decrease in capacitance which normally occurs due to the electric potential across the gap. By varying the thickness, the oxidation effect at the edge portions is reduced while the self-healing capabilities at the low oxidation areas is maintained.

7 Claims, 2 Drawing Sheets

METALLIZED FILM SERIES SECTION CAPACITOR WITH IMPROVED OXIDATION RESISTANCE

This is a continuation of application Ser. No. 08/329,793, filed Oct. 26, 1994 which is a continuation of application Ser. No. 08/141,165, filed Oct. 21, 1993, both now abandoned.

BACKGROUND OF THE INVENTION

1. Field of the Invention

The present invention is directed generally to a metallized film capacitor and, in particular, to a metallized film series section capacitor.

2. Description of the Prior Art

Metallized film capacitors typically include sheets of dielectric material each having a conductive layer thereon, usually a metal, which forms the capacitor electrodes. The conductive layers are generally applied to only one side of the dielectric and the conductive layers on a dielectric are placed against the uncoated side of an adjacent dielectric. The conductive layers are then electrically insulated from each other by the dielectric which holds a charge.

A series section metallized film capacitor includes a center margin electrode and a floating electrode, as shown in FIG. 1. The center margin electrode (15) is formed of two adjacent conductive layers (16, 17) spaced from one another by a gap (11). The floating electrode includes a second dielectric (19) having a conductive layer (13) thereon opposite the two layers (16), (17). A first capacitance is formed by the first conductive layer (16) of the center margin electrode, the dielectric (12) and the floating electrode (13). A second capacitance is formed by the second conductive layer (17) of the center margin electrode, the dielectric (12) and floating electrode (13). The common floating electrode connects the two capacitances in series which creates a potential between the conductive layers (16, 17) across the gap (11) of the center margin electrode.

Metallized film capacitors are known to have a "self-healing" capability, whereby short circuits between the conducting layers on opposite sides of the dielectric caused by a fault in the dielectric will be "cleared" or "self-healed". Self healing occurs in a series section capacitor when a defect in the dielectric (12) causes the center margin electrode (15) to short to the floating electrode (13) causing the metal of the electrodes to oxidize. The oxidation acts as an insulator which heals the short. If the metal forming the center margin electrode, however, is too thick, the heat required to oxidize and/or vaporize the metal will cause the center margin electrode to melt through the dielectric to the floating electrode creating an internal short which will not heal.

A problem associated with previous metallized film series section capacitors arises at the gap of the center margin electrode. The potential created across the gap causes the metal at the borders of the center margin electrode bordering the gap to oxidize. This oxidation reduces the effective area of the conductive layers (16) and (17) causing the overall capacitance of the capacitor to decrease.

SUMMARY OF THE INVENTION

Accordingly, it is desired to provide an improved metallized film series section capacitor which has improved oxidation resistance while maintaining self-healing over the major portion of the capacitor.

Generally speaking, in accordance with the present invention, a metallized film series section capacitor is provided. The series section capacitor includes a dielectric and first and second adjacent conductive layers on one side of the dielectric. The adjacent conductive layers are spaced from one another to form a gap therebetween. A third conductive layer is arranged at the other side of the dielectric opposite both the first and second conductive layers. One of the first or second conductive layers has a nominal thickness over a major portion of the conducting layer and a greater thickness at an edge portion which borders the gap. Preferably, both of the first and second adjacent conductive layers have edge portions bordering the gap which are thicker than the nominal thickness of their major portions.

The invention is based on the recognition that the potential across the gap between the adjacent conductive layers of the center margin electrode causes oxidation of the metal only along the edge portions of the layers bordering the gap. Although increasing the metal thickness across the entire electrode layer would reduce the oxidation effect, it would also adversely affect the self healing properties of the capacitor. An electrical short occurs between opposing conductive layers when a tiny hole is formed in the dielectric. The short is cleared by oxidization and/or vaporization of the portion of the electrode layers surrounding the hole caused by the heat generated at the electrical short. If the metal across the entire width of the layers of the center margin electrode is thickened sufficiently to counteract the oxidation at the edge portions, then the heat required to clear a short will tend to cause the thickened layers to melt through the dielectric, rather than oxidize, creating a short which will not heal. By increasing the metal thickness only along the edge portions bordering the gap, the oxidation and consequent reduction of capacitance is solved while the self-healing properties are retained over the major portion of the capacitor.

It should be noted that DE 28 26 481 A1 describes a metallized film capacitor in which the lead ends of the electrodes are made locally thicker to provide a better physical connection to lead wires. However, it appears that this reference does not take into consideration oxidation along a center margin electrode or self-healing properties.

In another embodiment of the invention, a rolled series section capacitor comprises a spiral structure in which the first dielectric having the first and second conductive layers alternates in the radial direction of the spiral structure with a second dielectric having the third conductive layer.

In yet another embodiment of the invention, a multi-section series capacitor includes a plurality of center margin electrodes on a dielectric layer.

Accordingly, it is an object of the present invention to provide an improved series section metallized film capacitor which has improved oxidation resistance near the gap of the center margin electrode.

A further object of the present invention is to provide a center margin electrode which will continue to have the self healing properties of a metallized film capacitor yet have improved oxidation resistance near the gap of the center margin electrode.

Yet another object of the instant invention is to provide a multiple series section metallized film capacitor with improved oxidation resistance near the gap of the center margin electrodes.

Still other objects and advantages of the invention will be apparent from the detailed description and drawings.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
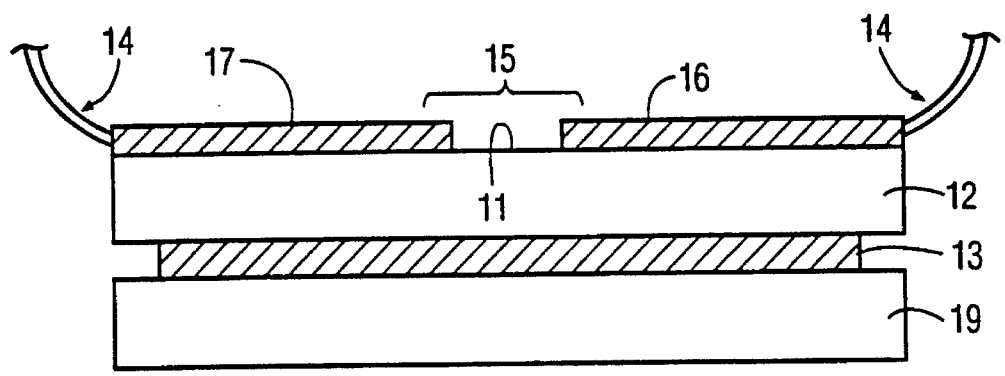
FIG. 1 is a cross sectional view of a metallized film series section capacitor in accordance with the prior art.
Figure 2:
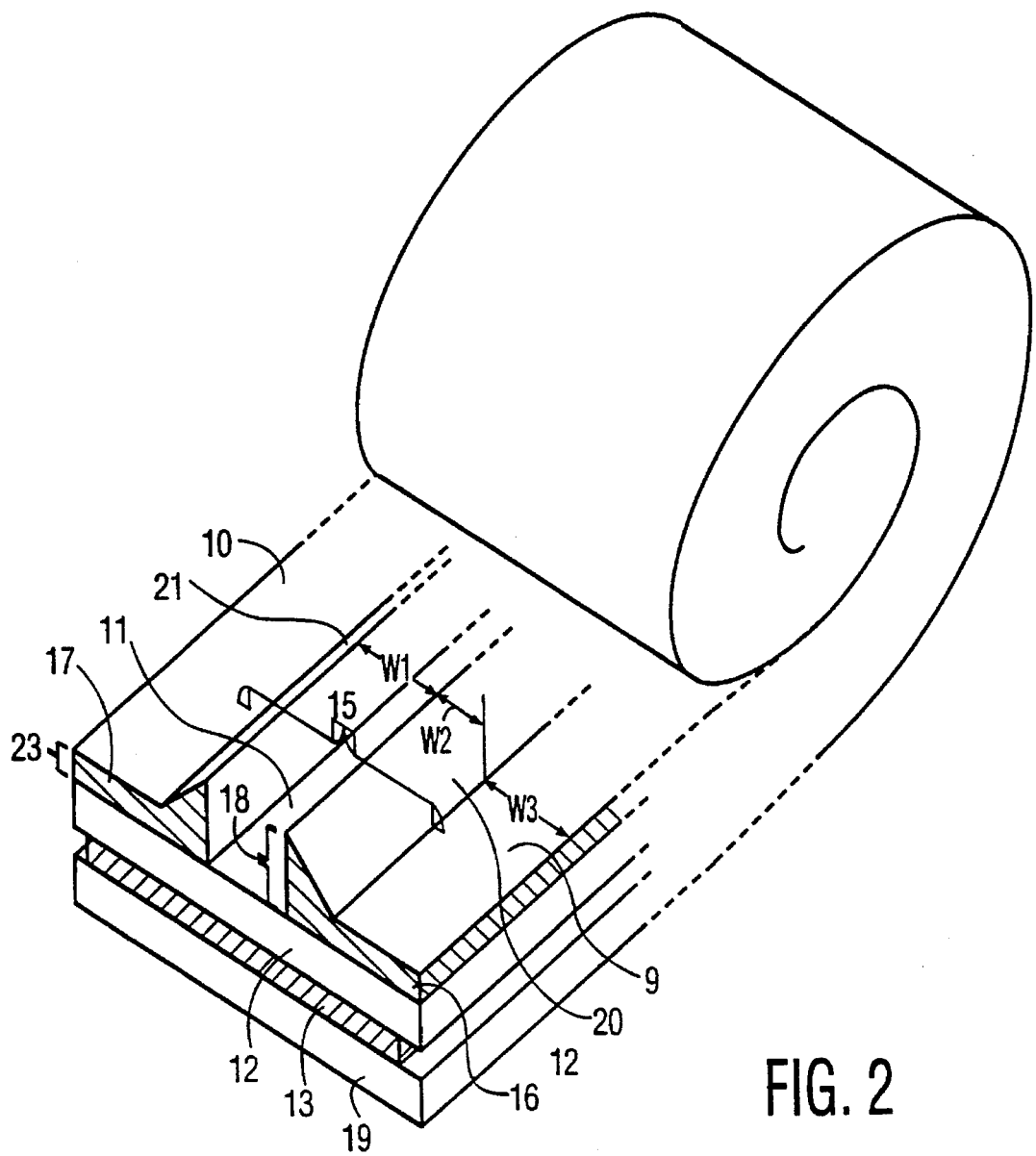
FIG. 2 is a perspective view of a rolled metallized film series section capacitor in accordance with the instant invention.

Reference is first made to FIG. 2 which depicts a rolled series section metallized film capacitor, in accordance with the invention in which the end is unrolled to illustrate its structure. Like reference numerals indicate like elements in other figures. To better illustrate the invention, the figures are not drawn to scale. The series section capacitor includes a first sheet of dielectric material 12 having a center margin electrode 15 and a second sheet of dielectric material 19 having a floating electrode 13. The center margin electrode 15 includes a first conductive layer 16 and a second conductive layer 17 adjacent to the first layer and separated therefrom by an uncoated gap 11. The floating electrode 13 includes a single conductive layer on the dielectric 19. The conductive layers are metallic, typically including a nucleating material of 0.5–1.0% of silver (Ag), copper (Cu), iron (Fe), tin (Sn), etc. with the remainder being zinc (Zn) or aluminum (Al). While the metal may be applied in many ways, it is most commonly applied by well-known vacuum deposition techniques. The dielectric layers can be formed of many materials, such as polypropylene, polyester, polycarbonate, teflon, etc.

The second dielectric sheet is positioned with the electrode 13 against the uncoated side of the dielectric 12. The two dielectric sheets are rolled together to obtain a rolled, or spiral, structure with the two dielectric sheets having their respective electrodes alternate with each other in the radial direction of the rolled structure.

Each of the layers 16, 17 corresponds to a separate one of two capacitances. A first capacitance is defined by the layer 16, dielectric 12 and conductive layer 13 and a second capacitance is defined by the other layer 17, dielectric 12, and conductive layer 13. Electrically, these two capacitances are connected in series through the floating electrode 13.

In the prior art electrodes, the layers 16, 17 and 13 have a nominal thickness selected such that the capacitor has a "self-healing" capacity. If the dielectric sheets have a minor fault which allows the conductive layers on the opposite sides thereof to short, the short causes the metal areas in contact to oxidize which heals the short. Self-healing occurs when the nominal thickness is less than about 0.5% of the thickness of the dielectric.

Due to the series nature of the capacitor, an electric potential is created across the gap 11 between the two layers 16, 17 when a charge is stored by the capacitor. This electric potential has been found to oxidize the layers 16, 17 along edge portions 20, 21 which border the gap 11. The oxidation decreases the conductive area of the conductive layers 16, 17 causing an overall reduction in capacitance of the capacitor. In accordance with the invention, the thickness 18 of the layers 16, 17 is increased over the nominal thickness only on the edge portions 20, 21 which are most subject to oxidation. While oxidation will still occur at the edge portions, the increased thickness prevents oxidation through the entire depth so that the conductive charge storing area is not reduced. The remaining, major portions 9 and 10 of the layers 16, 17 retain the nominal thickness. Thus, the self-healing capacity is retained over the major portion of the electrode while reduction in capacitance due to oxidation is counteracted.

If the metal layers 16, 17 and 13 are applied by vacuum deposition the thickness of the edge portions 20, 21 may be increased relative to the major portions 9, 10 by masking these major portions.

Figure 3:
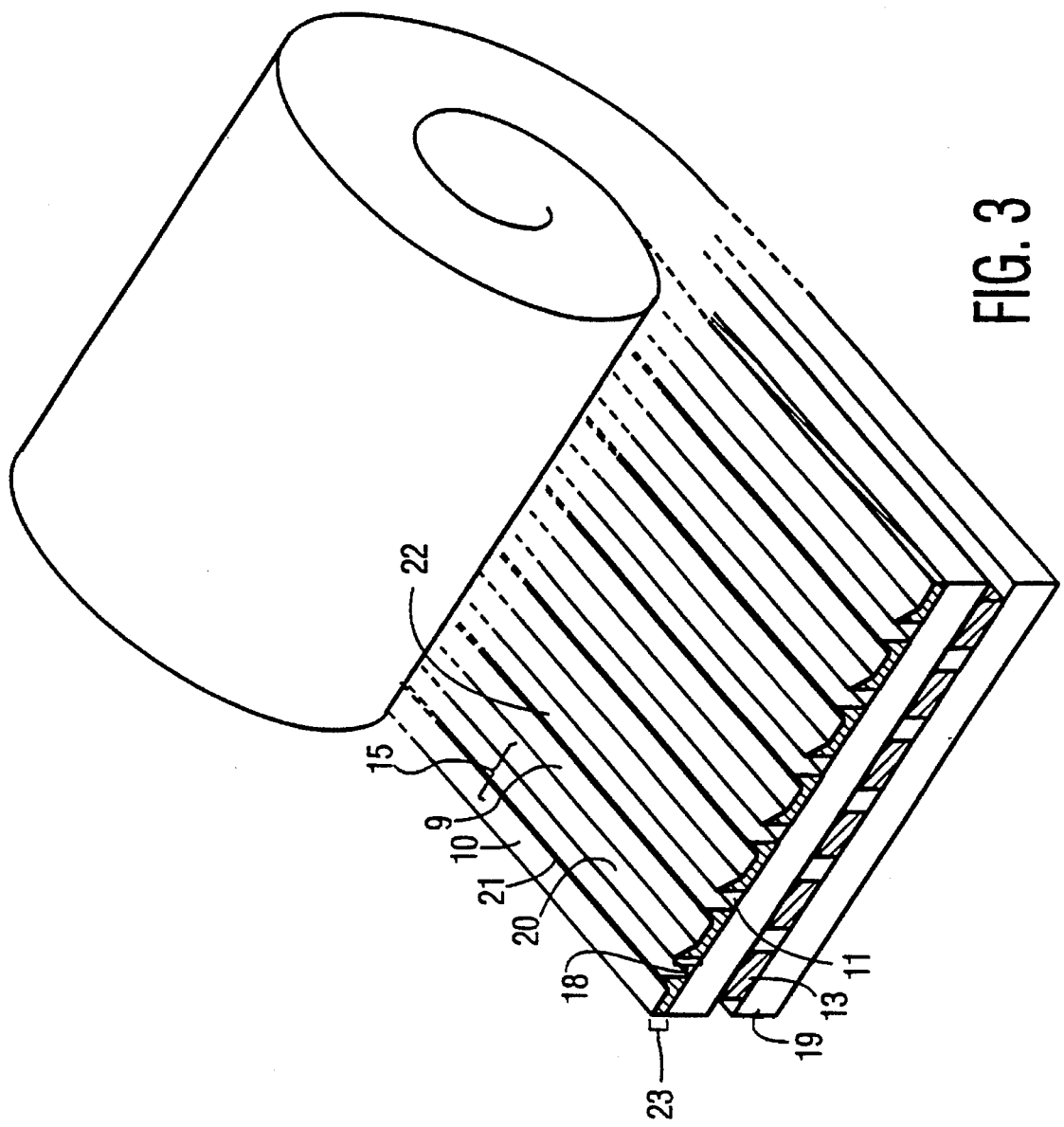
FIG. 3 is a perspective view of a multi-section series capacitor in accordance with another embodiment of the invention.

FIG. 3 is a multi-section series capacitor wherein multiple center margin electrodes 15 are formed on the dielectric 12 to provide a plurality of series connected capacitances. In this embodiment the edge portions 20, 21, and 22 of the center margin electrodes 15 all have an increased thickness to provide improved oxidation resistance. The floating electrodes 13 can also have an increased thickness at their respective edge portions, although this is not shown in FIG. 3. The number of center margin electrodes 15 may be increased or decreased depending on the needed capacitance. The number of floating electrodes 13 is dependent on the number of center margin electrodes 15.

The capacitor shown in FIG. 2 is a 1.8 µf, 660 volt AC series section capacitor. The dielectrics 12, 19 are polypropylene having a thickness of approximately 8 µm. The center margin electrode 15 is silver nucleated zinc including 0.5% of silver, with the remainder being zinc vacuum deposited on top of the polypropylene with a thickness 23 of approximately 200 Å. The edge portions 20 and 21 bordering the gap 11, however, have a metal thickness 18 of approximately 400 Å. The gap has a width "W1" of 5 mm. Each of the edge portions 20, 21 has a width "W2" of 1 mm while each of the major portions 9, 10 has a width "W3" of 21.9 mm. The metal of the edge portions 20, 21 of the center margin electrode has a resistance of approximately 3–5 Ω/sq, whereas the nominal thickness of the major portions 9, 10 of the electrode has a resistance of approximately 6–10 Ω/sq.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A metal-film capacitor with electrodes having self-healing properties, comprising:

a) at least first and second dielectric material sheets, b) vapor-deposited metal coatings on one side of each of the dielectric material sheets, said metal coatings having a composition and being so thin that a minor fault in a dielectric material sheet when located between two metal coatings and tending to cause an electrical short between the metal coatings will cause metal areas adjacent the fault to oxidize or vaporize healing the electrical short, c) said dielectric material sheets with metal coatings thereon being assembled such that the metal coating on the second dielectric material sheet engages an uncoated side of the first dielectric material sheet, d) said metal coating on the first dielectric material sheet constituting a center margin electrode by being divided into at least first and second spaced electrode portions with a gap between facing edges of the first and second electrode portions, e) said metal coating on the second dielectric material sheet constituting a floating electrode by underlying the first and second electrode portions and the gap between facing edges of the first and second electrode portions thereby forming at least two series capacitors between the first and second electrode portions when an electric potential is applied therebetween, f) said facing edges of the first and second electrode portions tending to oxidize when an electric potential is applied therebetween thereby reducing a conductive area of the first and second electrode portions and thus the capacitance of the series-connected capacitors, g) means for preventing substantial oxidation of the facing edges and loss of conductive area of the first and second electrode portions, said means for preventing substantial oxidation of the facing edges and loss of conductive area comprising increased edge thicknesses only of the facing edges of the first and second electrode portions compared to a remainder of the first and second electrode portions to retain the self-healing property of the remainder of the first and second electrode portions.

2. The metal-film capacitor of claim 1, wherein the metal coatings, except where thickened, have a thickness which is less than about 0.5% of the thickness of the dielectric material sheets.

3. The metal-film capacitor of claim 1, wherein the metal coatings, except where thickened, have a thickness of about 200 Å.

4. The metal-film capacitor of claim 3, wherein the increased edge thickness of the facing edges is about 400 Å.

5. The metal-film capacitor of claim 2, wherein the dielectric material sheets have a thickness of about 8μ.

6. The metal-film capacitor of claim 1, wherein the metal coatings are constituted principally of zinc or aluminum.

7. The metal-film capacitor of claim 2, wherein the dielectric material sheets are of polypropylene.

\* \* \* \* \*